(12) United States Patent
Akiyama

(10) Patent No.: US 12,549,694 B2
(45) Date of Patent: Feb. 10, 2026

(54) ILLUMINATOR AND PROJECTOR

(71) Applicant: SEIKO EPSON CORPORATION, Tokyo (JP)

(72) Inventor: Koichi Akiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 33 days.

(21) Appl. No.: 18/605,990

(22) Filed: Mar. 15, 2024

(65) Prior Publication Data

US 2024/0314275 A1 Sep. 19, 2024

(30) Foreign Application Priority Data

Mar. 17, 2023 (JP) ................................. 2023-043470

(51) Int. Cl.
*H04N 9/31* (2006.01)

(52) U.S. Cl.
CPC ................................. *H04N 9/3164* (2013.01)

(58) Field of Classification Search
CPC .. H04N 9/3164; H04N 9/3105; H04N 9/3152; H04N 9/3161; H04N 9/3158; G02B 27/48
See application file for complete search history.

(56) References Cited

U.S. PATENT DOCUMENTS

| | | |
|---|---|---|
| 2004/0239889 A1 | 12/2004 | Inamoto |
| 2014/0362437 A1 | 12/2014 | McKnight et al. |
| 2016/0327804 A1 | 11/2016 | Basler et al. |
| 2019/0124305 A1 | 4/2019 | Akiyama |
| 2019/0243225 A1 | 8/2019 | Akiyama |
| 2023/0305312 A1* | 9/2023 | Itoh .................... G02F 1/133611 |
| 2023/0417972 A1* | 12/2023 | Orsila .................... G02B 26/10 |

FOREIGN PATENT DOCUMENTS

| | | |
|---|---|---|
| JP | 2005-010772 A | 1/2005 |
| JP | 2008-216923 A | 9/2008 |
| JP | 2009-003091 A | 1/2009 |
| JP | 2012-118220 A | 6/2012 |
| JP | 2014-164175 A | 9/2014 |
| JP | 2015-092280 A | 5/2015 |
| JP | 2016-526192 A | 9/2016 |

(Continued)

*Primary Examiner* — Sonji N Johnson
(74) *Attorney, Agent, or Firm* — Dority & Manning, P.A.

(57) ABSTRACT

An illuminator includes a first light source that outputs first light having a first wavelength band, a second light source that outputs second light having a second wavelength band different from the first wavelength band, a light combining member that combines the first light and the second light with each other and outputs combined light, a diffuser that diffuses the combined light incident thereon, a light collector that collects the combined light and directs collected combined light toward the diffuser, a collimator that parallelizes the combined light outputted from the diffuser, a light homogenizer having a first lens array surface on which the combined light outputted from the collimator is incident and a second lens array surface integrated with the first lens array surface, a vibration generator that vibrates the light homogenizer, and a superimposing lens that superimposes light fluxes outputted from the light homogenizer on one another.

20 Claims, 6 Drawing Sheets

(56) References Cited

FOREIGN PATENT DOCUMENTS

| | | | | |
|---|---|---|---|---|
| JP | 2018-054759 A | 4/2018 | | |
| JP | 2019-078906 A | 5/2019 | | |
| JP | 2019-138940 A | 8/2019 | | |
| JP | 2019-159095 A | 9/2019 | | |
| JP | 2022-043198 A | 3/2022 | | |
| KR | 20210158091 A | * 12/2021 | ........... | G03B 21/206 |
| WO | WO-2024183875 A1 | * 9/2024 | ........... | H04N 9/3161 |

* cited by examiner

ILLUMINATOR AND PROJECTOR

The present application is based on, and claims priority from JP Application Serial Number 2023-043470, filed Mar. 17, 2023, the disclosure of which is hereby incorporated by reference herein in its entirety.

BACKGROUND

1. Technical Field

The present disclosure relates to an illuminator and a projector.

2. Related Art

To enhance the performance of projectors, there has been a proposed projector including an illuminator using a laser light source, which is a light source that has a wide color gamut and operates at high efficiency. JP-A-2019-078906 discloses an illuminator including a blue light source array, a red light source array, a green light source array, a light combining system, a light collection lens, and a diffuser plate.

JP-A-2019-078906 is an example of the related art.

The illuminator disclosed in JP-A-2019-078906 reduces speckle noise generated in a projection image by combining three color laser beams with one another and causing the combined light to pass through a transmissive diffuser plate, but it cannot be said that the configuration described above is not a sufficient measure for reducing speckle noise, and a new technology has been desired.

SUMMARY

To solve the problem described above, according to an aspect of the present disclosure, there is provided an illuminator including a first light source that outputs first light having a first wavelength band, a second light source that outputs second light having a second wavelength band different from the first wavelength band, a light combining member that combines the first light and the second light with each other and outputs combined light, a diffuser including a substrate having a diffuser surface that diffuses the combined light incident thereon and outputs the diffused combined light and a driver that rotates the substrate, a light collector that is disposed between the light combining member and the diffuser, collects the combined light, and directs collected combined light toward the diffuser, a collimator that parallelizes the combined light outputted from the diffuser, a light homogenizer having a first lens array surface on which the combined light outputted from the collimator is incident and a second lens array surface via which the light incident from the first lens array surface exits, the second lens array surface being integrated with the first lens array surface, a vibration generator that vibrates the light homogenizer, and a superimposing lens that superimposes light fluxes outputted from the light homogenizer on one another.

According to another aspect of the present disclosure, there is provided a projector including the illuminator described above, a light modulator that modulates light outputted from the illuminator, and a projection optical apparatus that projects the light modulated by the light modulator.

DESCRIPTION OF EMBODIMENTS

Figure 1:
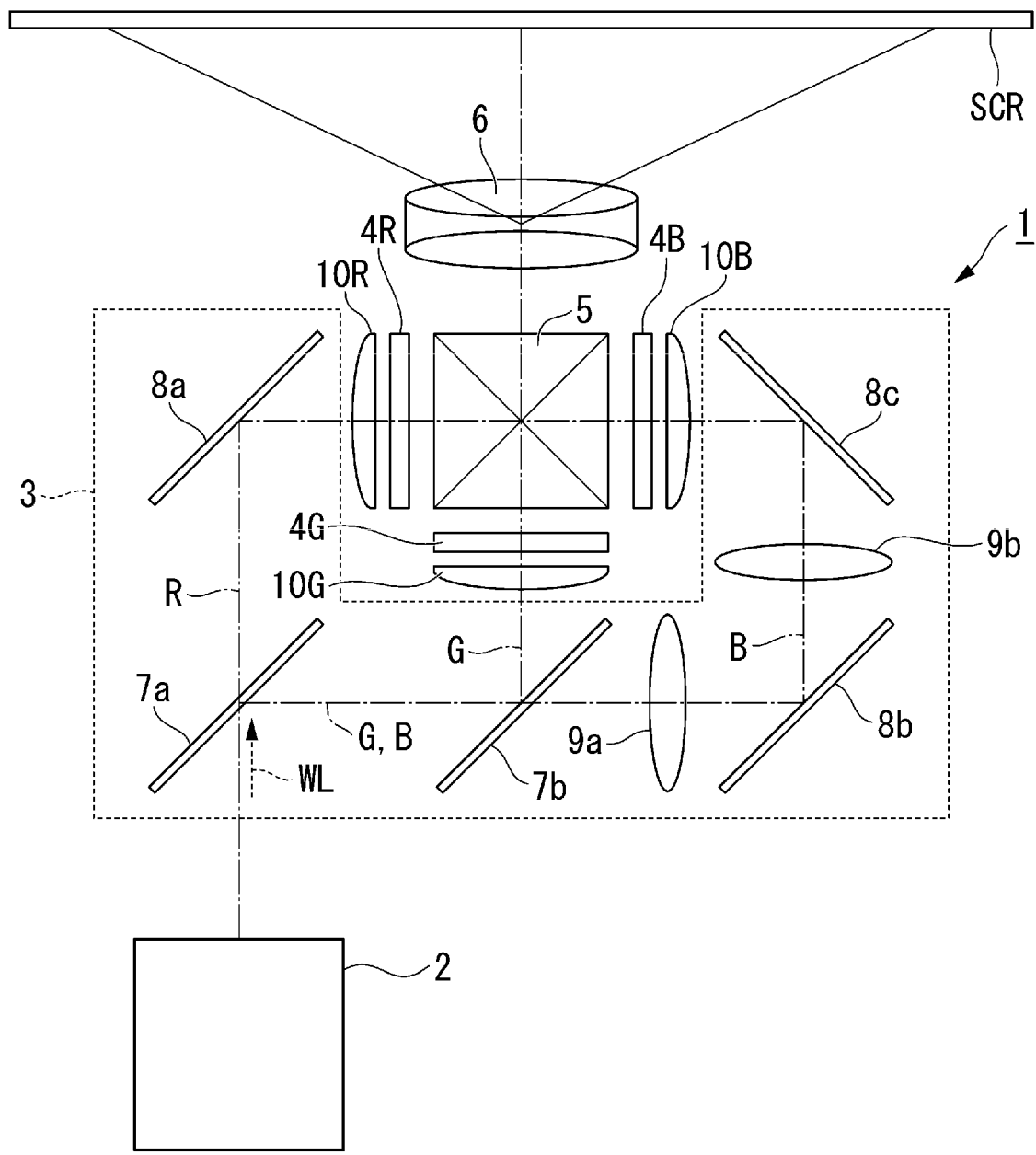
FIG. 1 is a schematic configuration diagram showing a projector.

An embodiment of the present disclosure will be described below in detail with reference to the drawings. In the drawings used in the description below, a characteristic portion is enlarged for convenience in some cases for clarity of the characteristic thereof, and the dimension ratio and other factors of each component are therefore not always equal to actual values.

The embodiment of the present disclosure will be described below.

FIG. 1 is a schematic configuration diagram showing a projector according to the embodiment.

A projector 1 according to the present embodiment is a projection-type image display apparatus that displays video images on a screen SCR, as shown in FIG. 1. The projector 1 includes an illuminator 2, a color separation system 3, light modulators 4R, 4G, and 4B, a light combining system 5, and a projection optical apparatus 6.

The illuminator 2 outputs white illumination light WL toward the color separation system 3. The configuration of the illuminator 2 will be described later in detail.

The color separation system 3 separates the illumination light WL into red illumination light R, green illumination light G, and blue illumination light B. The color separation system 3 includes a dichroic mirror 7a, a dichroic mirror 7b, a total reflection mirror 8a, a total reflection mirror 8b, a total reflection mirror 8c, a first relay lens 9a, and a second relay lens 9b. Red, green, and blue are hereinafter in some cases collectively referred to as RGB.

The dichroic mirror 7a separates the illumination light WL from the illuminator 2 into the red illumination light R and the other light (green illumination light G and blue illumination light B). The dichroic mirror 7a transmits the red illumination light R and reflects the separated other light. The second dichroic mirror 7b reflects the green illumination light G and transmits the blue illumination light B.

The total reflection mirror 8a reflects the red illumination light R toward the light modulator 4R. The total reflection mirrors 8b and 8c guide the blue illumination light B to the light modulator 4B. The green illumination light G is reflected off the dichroic mirror 7b toward the light modulator 4G.

The first relay lens 9a and the second relay lens 9b are disposed at a position downstream from the dichroic mirror 7b in the optical path of the blue illumination light B.

The light modulator 4R modulates the red illumination light R in accordance with image information to form red image light. The light modulator 4G modulates the green illumination light G in accordance with image information to form green image light. The light modulator 4B modulates the blue illumination light B in accordance with image information to form blue image light.

The light modulators 4R, 4G, and 4B are each, for example, a transmissive liquid crystal panel. Polarizers (not shown) are disposed at the light incident and exiting sides of each of the liquid crystal panels.

Field lens 10R, 10G, and 10B are disposed at the light incident side of the light modulators 4R, 4G, and 4B, respectively.

The three types of image light from the light modulators 4R, 4G, and 4B enter the light combining system 5. The light combining system 5 combines the three types of image light with one another and outputs the combined image light toward the projection optical apparatus 6. The light combining system 5 is formed, for example, of a cross dichroic prism.

The projection optical apparatus 6 is formed of a projection lens group and enlarges the combined image light from the light combining system 5 and projects the enlarged image light toward the screen SCR. Enlarged color video images are thus displayed on the screen SCR.

Figure 2:
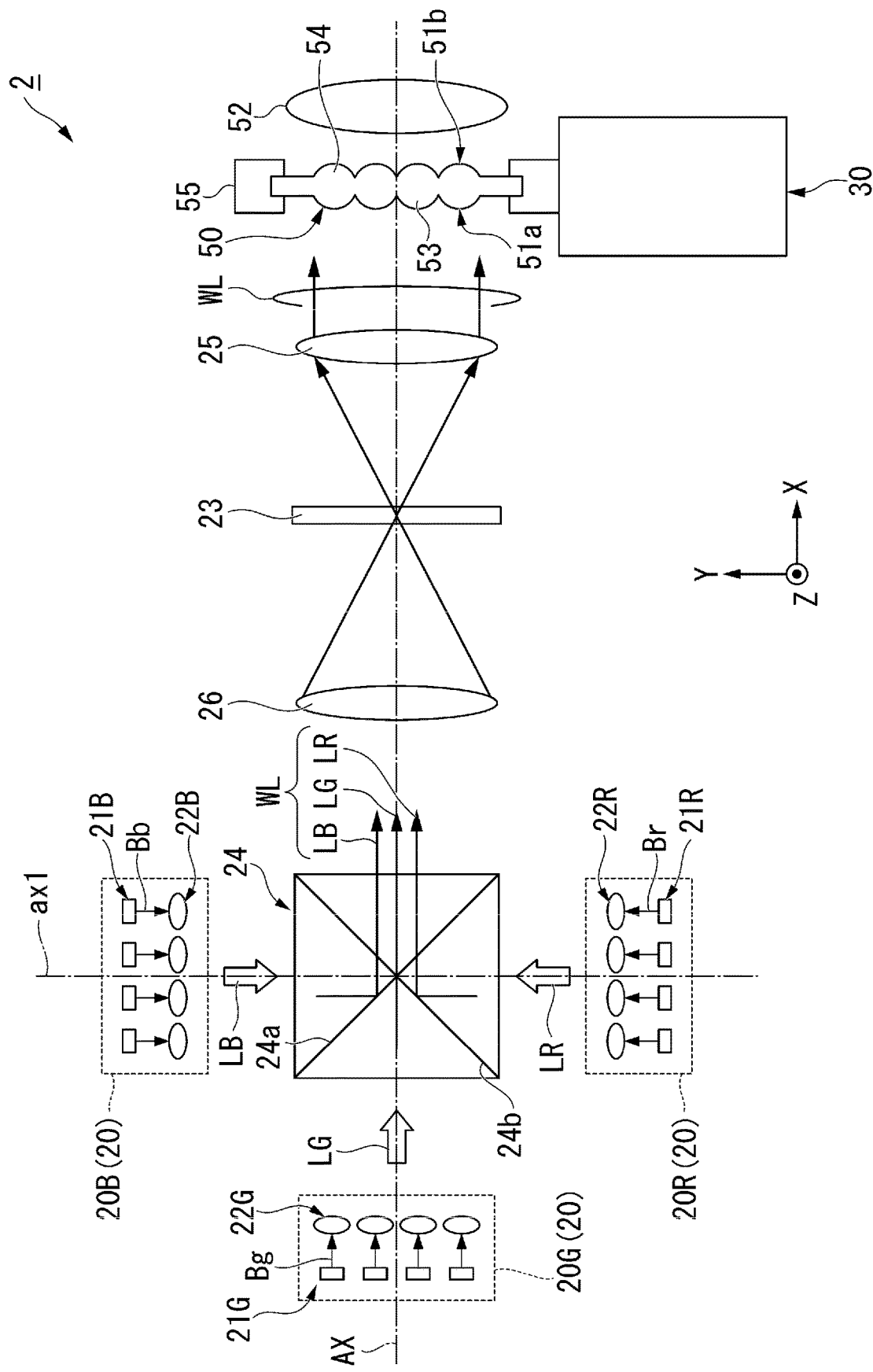
FIG. 2 shows a schematic configuration of an illuminator.

The illuminator 2 according to the embodiment of the present disclosure will be subsequently described. FIG. 2 shows a schematic configuration of the illuminator 2.

The illuminator 2 includes a light source apparatus 20, a light collector 26, a diffuser plate 23, a collimator 25, a light homogenizer 50, a superimposing lens 52, and a vibration generator 30, as shown in FIG. 2.

The light source apparatus 20 includes a red light source (first light source) 20R, a green light source (second light source) 20G, a blue light source (third light source) 20B, and a light combining member 24.

In the present embodiment, the red light source 20R, the light combining member 24, and the blue light source 20B are provided on an optical axis ax1 of the red light source 20R. The green light source 20G, the light combining member 24, the light collector 26, the diffuser plate 23, the collimator 25, the light homogenizer 50, and the superimposing lens 52 are provided on an illumination optical axis AX of the illuminator 2. The optical axis ax1 and the illumination optical axis AX are perpendicular to each other. Note that the optical axis of the blue light source 20B coincides with the optical axis ax1 of the red light source 20R, and the optical axis of the green light source 20G coincides with the illumination optical axis AX.

An XYZ coordinate system is used in some cases in the following description of the shapes and arrangement of the components of the illuminator 2. In the present specification, it is assumed in the description that the X-direction is the direction along the illumination optical axis AX of the illuminator 2, that the Y-direction is the direction in which red light LR is output from the red light source 20R and which extends along the optical axis ax1, and that the Z direction is the direction perpendicular to the X-direction and the Y-direction.

The red light source 20R includes a plurality of red semiconductor lasers 21R and a plurality of collimator lenses 22R. The green light source 20G includes a plurality of green semiconductor lasers 21G and a plurality of collimator lenses 22G. The blue light source 20B includes a plurality of blue semiconductor lasers 21B and a plurality of collimator lenses 22B.

The plurality of red semiconductor lasers 21R are arranged in an array in a plane perpendicular to the optical axis ax1. The red semiconductor lasers 21R each output a red beam Br having a first wavelength band ranging, for example, from 585 to 720 nm. The plurality of collimator lenses 22R are disposed in correspondence with the plurality of red semiconductor lasers 21R, and each convert the red beam Br emitted from the corresponding laser into parallelized light.

Based on the configuration described above, the red light source 20R outputs the red light LR containing the plurality of red beams Br formed of the paralleled luminous fluxes toward the light combining member 24.

The plurality of green semiconductor lasers 21G are arranged in an array in a plane perpendicular to the illumination optical axis AX. The green semiconductor lasers 21G each output a green beam Bg having a second wavelength band different from the first wavelength band and ranging, for example, from 495 to 585 nm. The plurality of collimator lenses 22G are disposed in correspondence with the plurality of green semiconductor lasers 21G, and each convert the green beam Bg emitted from the corresponding laser into parallelized light.

Based on the configuration described above, the green light source 20G outputs green light LG containing the plurality of green beams Bg formed of the paralleled luminous fluxes toward the light combining member 24.

The plurality of blue semiconductor lasers 21B are arranged in an array in a plane perpendicular to an optical axis ax1. The blue semiconductor lasers 21B each output a blue beam Bb having a third wavelength band different from the first and second wavelength bands and ranging, for example, from 380 to 495 nm. The plurality of collimator lenses 22B are disposed in correspondence with the plurality of blue semiconductor lasers 21B, and each convert the blue beam Bb emitted from the corresponding laser into parallelized light.

Based on the configuration described above, the blue light source 20B outputs blue light LB containing the plurality of blue beams Bb formed of the paralleled luminous fluxes toward the light combining member 24.

The light combining member 24 outputs the white illumination light WL, which is the combination of the R light, the G light, and the B light (red light LR, green light LG, and blue light LB) output from the light source apparatus 20, in one direction and causes the white illumination light WL to enter the light collector 26. The light collector 26 collects the illumination light WL into a spot at a predetermined position.

The light combining member 24 is formed of a cross dichroic prism. The cross dichroic prism includes a first dichroic mirror 24a and a second dichroic mirror 24b. The first dichroic mirror 24a and the second dichroic mirror 24b are so disposed that the two dichroic mirrors intersect with the optical axes ax1 and ax2 and incline by 45° with respect thereto. The first dichroic mirror 24a and the second dichroic mirror 24b intersect with each other and incline by 45° with respect thereto.

The first dichroic mirror 24a is optically characterized in that it reflects the blue light LB and transmits the green light LG and the red light LR. The second dichroic mirror 24b is optically characterized in that it reflects the red light LR and transmits the blue light LB and the green light LG.

The light collector 26 collects the illumination light WL and causes the collected illumination light WL to be incident onto the diffuser plate 23. The diffuser plate 23 is disposed at the light exiting side of the light collector 26 (side facing positive end of X-direction). The diffuser plate 23 diffuses the illumination light WL to homogenize the illuminance distribution of the illumination light WL.

Note that the diffuser plate 23 can, for example, be any known diffusers, such as a ground glass plate, a holographic diffuser, a transparent substrate having blasted surfaces, and a transparent substrate in which scatterers such as beads are dispersed and scatter light.

The collimator 25 parallelizes the illumination light WL output from the diffuser plate 23 and outputs the parallelized illumination light WL toward the light homogenizer 50. In the present embodiment, the collimator 25 is formed of a single convex lens. The collimator 25 may be formed of a plurality of lenses.

The light homogenizer 50, along with the superimposing lens 52, homogenizes the illuminance distribution of the illumination light WL output from the collimator 25 in an image generation area of each of the light modulators 4R, 4G, and 4B.

The light homogenizer 50 in the present embodiment is formed of a double-sided multi-lens array having a first lens array surface 51a and a second lens array surface 51b integrated with each other. That is, the light homogenizer 50 in the present embodiment is formed of a single optical member having the first lens array surface 51a and the second lens array surface 51b formed integrally therewith.

Note that the interval between the lenses of the multi-lens array that form the light homogenizer 50 of the embodiment is preferably set, for example, at a value greater than or equal to 0.1 mm but smaller than or equal to 1 mm. The light homogenizer 50 is thus formed of a narrow-interval microlens array unit, which increases the number of light source images superimposed on one another in an illumination receiving area to improve light uniformity and suppress generation of speckle noise, which will be described later.

The first lens array surface 51a is the surface on which the illumination light WL output from the collimator 25 is incident. The first lens array surface 51a includes a plurality of first lenslets 53, which divide the illumination light WL into a plurality of sub-luminous fluxes. The plurality of first lenslets 53 are arranged in a matrix in a plane perpendicular to the illumination optical axis AX.

The second lens array surface 51b is the surface via which the plurality of sub-luminous fluxes divided via the first lens array surface 51a exit. The second lens array surface 51b includes a plurality of second lenslets 54 corresponding to the first lenslets 53 at the first lens array surface 51a. The second lens array surface 51b along with the downstream superimposing lens 52 brings images of the first lenslets 53 at the first lens array surface 51a into focus at or in the vicinity of the image generation area of each of the light modulators 4R, 4G, and 4B. The plurality of second lenslets 54 are arranged in a matrix in a plane perpendicular to the illumination optical axis AX.

The superimposing lens 52 collects the plurality of sub-luminous fluxes output from the light homogenizer 50 into spots to cause the spots to be superimposed on one another at or in the vicinity of the image generation area of each of the light modulators 4R, 4G, and 4B.

The light homogenizer 50 is housed in a holder 55. The holder 55 is a member that is made of rubber and frames an outer circumferential section of the light homogenizer 50. The vibration generator 30 is disposed in contact with the holder 55 and vibrates the light homogenizer 50 via the holder 55. The holder 55 in the present embodiment holds the light homogenizer 50 in a state in which the rotation of the light homogenizer 50 around the Z-axis or the Y-axis is restricted.

The vibration generator 30 vibrates the first lens array surface 51a and the second lens array surface 51b integrally each with other along directions perpendicular to the optical axis of the light homogenizer 50. The state in which the first lens array surface 51a and the second lens array surface 51b vibrate integrally with each other means that the positional relationship between the first lens array surface 51a and the second lens array surface 51b does not change even when the vibration generator 30 vibrates the light homogenizer 50.

More specifically, the vibration generator 30 vibrates the first lens array surface 51a and the second lens array surface 51b integrally with each other along the Y-direction (first direction) perpendicular to the optical axis of the light homogenizer 50 and the Z-direction (second direction) perpendicular to the optical axis and the Y-direction. The light homogenizer 50 vibrates with the rotation thereof around the Z-axis or the Y-axis restricted by the holder 55.

In the projector 1 according to the present embodiment, the first lens array surface 51a of the light homogenizer 50 is optically conjugate with the image generation areas of the light modulators 4R, 4G, and 4B where the light modulators produce images. The first lenslets 53 at the first lens array surface 51a therefore each have a rectangular shape substantially similar to the shape of the image generation area of each of the light modulators 4R, 4G, and 4B.

On the other hand, the screen surface onto which the image light generated in the image generation area of each of the light modulators 4R, 4G, and 4B is projected is optically conjugate with the image generation area of each of the light modulators 4R, 4G, and 4B. That is, it can be said that the first lens array surface 51a, which is conjugate with the image generation areas, is indirectly conjugate with the screen surface.

That is, the projector 1 according to the present embodiment can reduce speckle noise in a projection image by vibrating the first lens array surface 51a of the light homogenizer 50, which is conjugate with the screen surface, as will be described later.

It is preferable that the frequency of the vibration generated by the vibration generator 30 is higher than or equal to 60 Hz but lower than or equal to 20000 Hz. The reason for this is that a frequency lower than 60 Hz causes flicker generated in a projection image. Another reason for this is that a frequency higher than 20000 Hz increases the cost of the projector, but does not change the situation in which it is difficult for the human eyes to perceive the effect of speckle noise reduction.

The projector 1 according to the present embodiment can therefore efficiently reduce the speckles while suppressing the cost of the projector with the vibration frequency of the vibration generator 30 set at a value higher than or equal to 60 Hz but lower than or equal to 20000 Hz.

Figure 3:
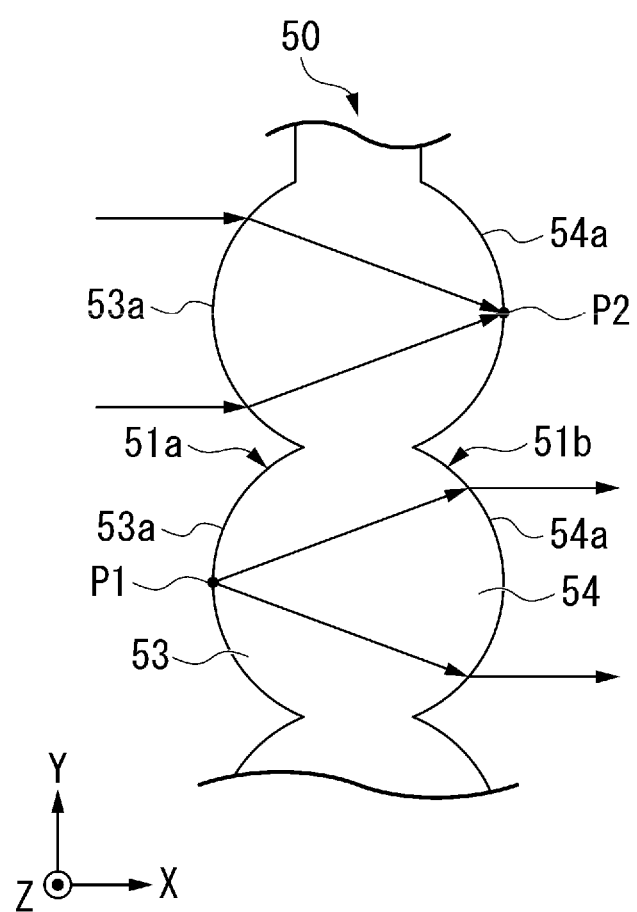
FIG. 3 shows the configuration of a light homogenizer.

FIG. 3 shows the configuration of the light homogenizer 50.

A focal point P1 of each of the plurality of second lenslets 54 at the second lens array surface 51b is located at a light incident surface 53a of the corresponding one of the plurality of first lenslets 53, as shown in FIG. 3. The light incident via the light incident surface 53a of each of the first lenslets 53 therefore exits as parallelized light from the corresponding second lenslet 54.

A focal point P2 of each of the plurality of first lenslets 53 at the first lens array surface 51a is located at a light exiting surface 54a of the corresponding one of the plurality of second lenslets 54. The divided sub-luminous fluxes from the first lenslets 53 are therefore focused on the light exiting surfaces 54a of the second lenslets 54, so that the second lenslets 54 can efficiently capture and outputs the light from the first lenslets 53. Light lost at the light homogenizer 50 can thus be reduced.

Figure 4:
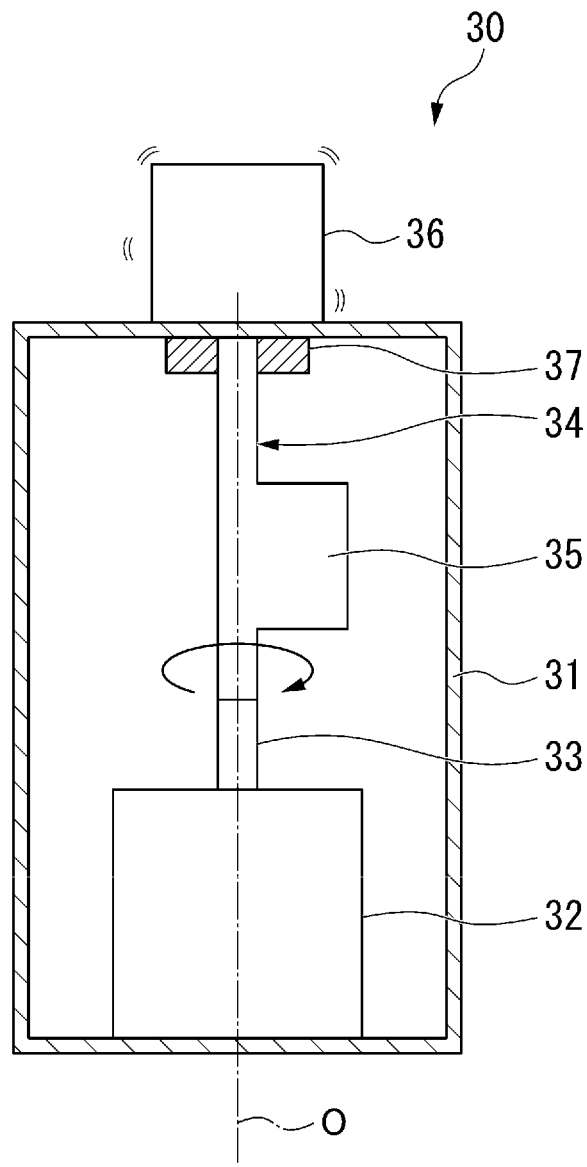
FIG. 4 shows the configuration of a vibration generator.

FIG. 4 shows an example of the configuration of the vibration generator 30.

The vibration generator 30 includes an enclosure body 31 including a contact section 36, which is in contact with the light homogenizer 50, a motor 32 including a shaft 33, which rotates around an axis of rotation O, a rotary member 34 provided at the shaft 33 of the motor 32, and a bearing 37, which rotatably supports the rotary member 34, as shown in FIG. 4. The axis of rotation O is an imaginary axis passing through the center of the shaft 33.

The enclosure body 31 houses the motor 32, the rotary member 34, and the bearing 37. The rotary member 34 has one end that extends in the direction along the axis of rotation O and is linked to the shaft 33, and another end that extends in the direction along the axis of rotation O and is held by the bearing 37, and includes a weight 35, which is located at the center of the rotary member 34 and is eccentric to the axis of rotation O. The state in which the weight 35 is eccentric to the axis of rotation O means a state in which the center of gravity of the weight 35 is shifted in the direction perpendicular to the axis of rotation O.

In the vibration generator 30, the shaft 33 of the motor 32 rotates to rotate the rotary member 34 along with the shaft 33. In this process, since the weight 35 rotates with the center of gravity thereof shifted from the axis of rotation O, the motor 32 itself is swung by the weight 35 and hence vibrates. The vibration of the motor 32 is transmitted to the enclosure body 31 and vibrates the light homogenizer 50 via the contact section 36.

According to the vibration generator 30 in the present embodiment, the simplified configuration thereof, in which the rotary member 34, which rotates along with the shaft 33 of the motor 32, is provided with the weight 35 eccentric to the axis of rotation O, can achieve a low-cost configuration in which the light homogenizer 50 vibrates without an increase in the size of the device.

In the illuminator 2 according to the present embodiment, the color light LR, LG, and LB contained in the illumination light WL is coherent light, which may produce speckles in a projection image.

There has been a known method for reducing speckle noise in a projection image by shaking the screen surface onto which an image is projected by a projector. However, screens are large in general, so that it is very difficult to achieve the configuration in which the screen surface is shaken.

In contrast, the illuminator 2 according to the present embodiment includes the red light source 20R, which outputs the red light LR, the green light source 20G, which outputs the green light LG, the blue light source 20B, which outputs the blue light LB, the light combining member 24, which combines the red light LR, the green light LG, and the blue light LB with one another and outputs the resultant illumination light WL, the diffuser plate 23, which diffuses the illumination light WL, the light collector 26, which is disposed between the light combining member 24 and the diffuser plate 23, collects the illumination light WL, and directs the collected illumination light WL toward the diffuser plate 23, the collimator 25, which parallelizes the illumination light WL output from the diffuser plate 23, the light homogenizer 50, which has the first lens array surface 51a, on which the illumination light WL output from the collimator 25 is incident, and the second lens array surface 51b, via which the light having traveled via the first lens array surface 51a exits, with the first lens array surface 51a and the second lens array surface 51b integrated with each other, the vibration generator 30, which vibrates the light homogenizer 50, and the superimposing lens 52, which superimposes the luminous fluxes output from the light homogenizer 50 on one another.

Therefore, in the illuminator 2 according to the present embodiment, the vibration generator 30 vibrates the first lens array surface 51a, which is conjugate with the screen SCR, onto which an image is projected, to reduce speckle noise in an image projected onto the screen, as if the screen SCR, on which the image is projected, were vibrated.

That is, the projector 1 according to the present embodiment can reduce speckle noise in a projection image as if the screen SCR, onto which the image is projected, were vibrated. That is, the speckle pattern produced by the color light LR, LG, and LB is changed over time, so that viewers of the projector 1 view the time-averaged speckle pattern, which is unlikely to be visually recognized, as in the case where the screen SCR is vibrated.

The illuminator 2 according to the present embodiment, in which the focal point P1 of each of the second lenslets 54 is located at the light incident surface 53a of the corresponding first lenslet 53 as described above, can output parallelized light from the second lenslets 54 even when the light homogenizer 50 vibrates. It is therefore possible to suppress a change in the angle of incidence of the light having exited via the second lens array surface 51b of the light homogenizer 50 with respect to the superimposing lens 52.

In the present embodiment, when the light homogenizer 50 is vibrated, the rotation of the light homogenizer 50 around the Z-axis or the Y-axis is restricted, so that the light having exited as parallelized light via the second lens array surface 51b enters the superimposing lens 52 at a predetermined angle.

As described above, the illuminator 2 according to the present embodiment, in which the angle of incidence of the light from the light homogenizer 50 incident on the superimposing lens 52 does not change even when the light homogenizer 50 is vibrated, causes no movement of the illumination area illuminated by the superimposing lens 52, that is, the illumination area of the image generation area of each of the light modulators 4R, 4G, and 4B.

Therefore, according to the illuminator 2 according to the present embodiment, even when the light homogenizer 50 vibrates, the illuminance distribution on the image generation area of each of the light modulators 4R, 4G, and 4B, which is the illumination receiving area, does not change.

The projector 1 according to the present embodiment including the illuminator 2 can therefore display a higher-quality image by vibrating the first lens array surface 51a, which is conjugate with the screen surface, without degradation of the quality of the projection image, to reduce generation of speckles.

In the illuminator 2 according to the embodiment described above, the light homogenizer 50 is formed of a single optical component having the first lens array surface 51a and the second lens array surface 51b integrated therewith, and the light homogenizer may instead be formed of two optical components, one optical component having a first multi-lens surface and the other optical component having a second multi-lens surface.

First Variation

Another form of the light homogenizer will be described below as a variation. The difference between the present variation and the embodiment described above is that the first and second multi-lens surfaces of the light homogenizer are formed of two optical members. The configurations common to those in the embodiment described above therefore have the same reference characters and will not be described in detail.

Figure 5:
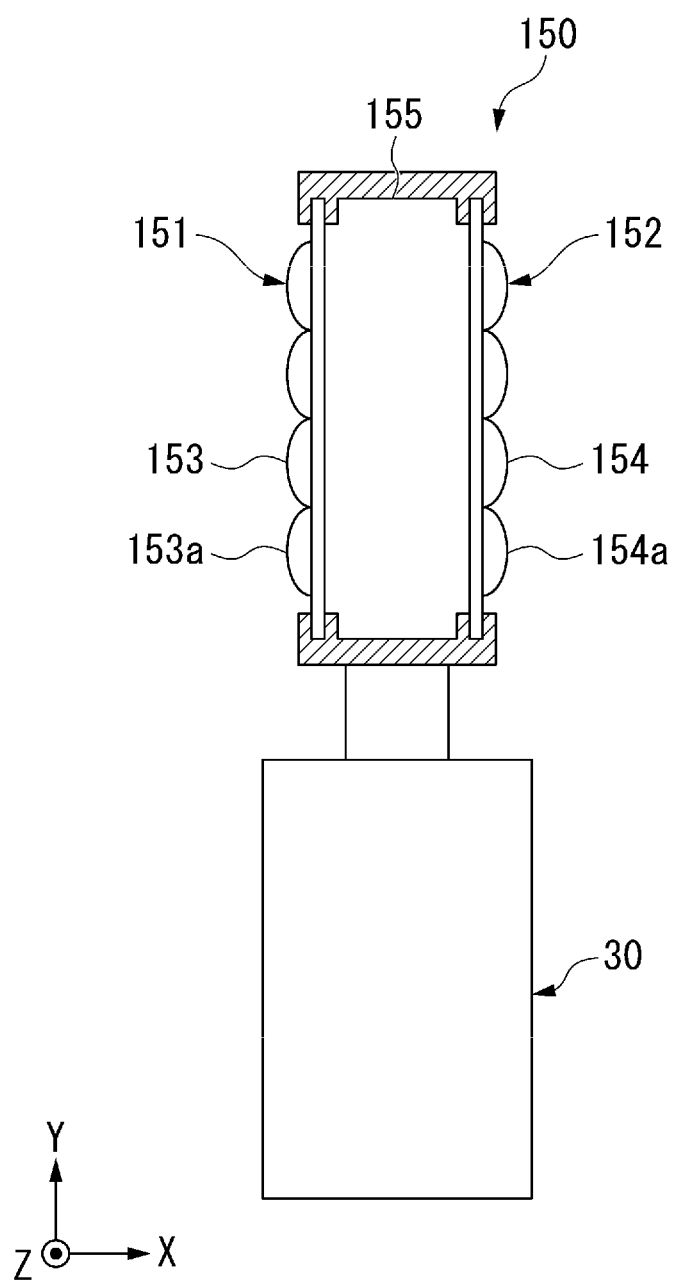
FIG. 5 shows the configuration of the light homogenizer according to a first variation.

FIG. 5 shows the configuration of the light homogenizer according to the variation.

A light homogenizer 150 according to the present variation includes a first lens array (first optical member) 151, a second lens array (second optical member) 152, and a holding member 155, which holds the first lens array 151 and the second lens array 152, as shown in FIG. 5.

The first lens array 151 has a first lens array surface 153a. The first lens array surface 153a includes a plurality of first lenslets 153, which divide the illumination light WL into a plurality of sub-luminous fluxes. The second lens array 152 has a second lens array surface 154a. The second lens array surface 154a includes a plurality of second lenslets 154 corresponding to the first lenslets 153 at the first lens array surface 153a.

The holding member 155 holds the first lens array 151 and the second lens array 152 integrally with each other and ensures a fixed position of the first lens array surface 153a relative to the second lens array surface 154a. Specifically, the holding member 155 holds the first lens array 151 and second lens array 152 integrally with each other in such a way that the optical axis of each of the first lenslets 153 coincides with the optical axis of the corresponding second lenslet 154.

In the light homogenizer 150 according to the present variation, the shapes of the first lens array surface 153a and the second lens array surface 154a or the positional relationship therebetween is equal to the shapes of the first lens array surface 51a and the second lens array surface 51b of the light homogenizer 50 or the positional relationship therebetween.

In the present variation, the vibration generator 30 is disposed in contact with the holding member 155 and vibrates the light homogenizer 150 via the holding member 155. The holding member 155 holds the light homogenizer 150 in the state in which the rotation of the light homogenizer 150 around the Z-axis or the Y-axis is restricted.

Also in the light homogenizer 150 according to the present variation, the vibration generator 30 can vibrate the first lens array surface 153a and the second lens array surface 154a integrally with each other along the Y-direction and the Z-direction, which are perpendicular to the optical axis of the light homogenizer 150.

The embodiment and the first variation described above have been described with reference to the illuminator 2, in which the diffused light having passed through the diffuser plate 23 enters the light homogenizer 50 (150), and the illuminator according to the present disclosure can also be used in an illuminator in which the light reflected off a diffuser plate enters a light homogenizer.

Second Variation

Another form of the illuminator will be described below as a second variation.

The difference between the present variation and the embodiment described above is the configurations of the diffuser plate and therearound in the illuminator, and the other configurations are the same. The configurations common to those in the embodiment described above therefore have the same reference characters and will not be described in detail.

Figure 6:
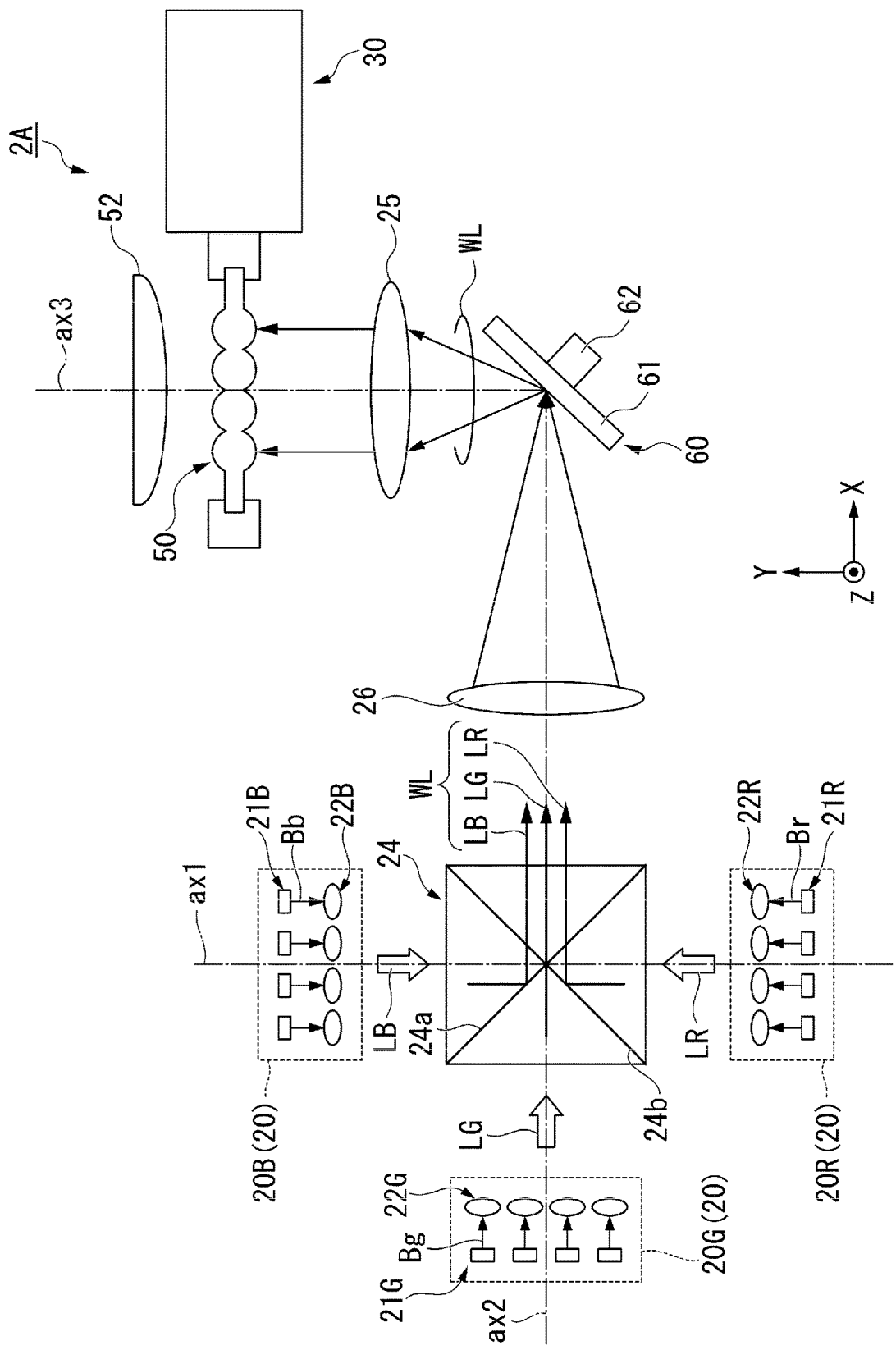
FIG. 6 shows a schematic configuration of the illuminator according to a second variation.

FIG. 6 shows a schematic configuration of the illuminator according to the present variation.

An illuminator 2A according to the present variation includes the light source apparatus 20, the light collector 26, a rotary diffuser 60, the collimator 25, the light homogenizer 50, the superimposing lens 52, and the vibration generator 30, as shown in FIG. 6.

In the present variation, the green light source 20G, the light combining member 24, the light collector 26, and the rotary diffuser 60 are provided on the optical axis ax2 of the green light source 20G. The rotary diffuser 60, the collimator 25, the light homogenizer 50, and the superimposing lens 52 are provided on an illumination optical axis ax3 of the illuminator 2A. Note that the optical axes ax1 and ax2 are perpendicular to each other, and that the optical axis ax1 and the illumination optical axis ax3 are parallel to each other.

In the present variation, the light collector 26 collects the illumination light WL and causes the collected illumination light WL to be incident on the rotary diffuser 60. The rotary diffuser 60 diffuses the illumination light WL to homogenize the illuminance distribution of the illumination light WL. The rotary diffuser 60 includes a diffuser plate 61, which can rotate around a predetermined axis of rotation, and a driver 62 formed of a motor. The diffuser plate 61 is produced, for example, by forming an irregular structure at a surface of a disk made of metal, such as aluminum, for example, by etching or blasting the surface of the disk. The rotary diffuser 60 is disposed so as to intersect with the optical axis ax2 and the illumination optical axis ax3 and incline by 45° with respect thereto.

Also in the illuminator 2A according to the present variation, the vibration generator 30 can vibrate the light homogenizer 50 to reduce the speckle noise. Furthermore, since the illuminator 2A according to the present variation uses a reflective diffuser as the diffuser plate 61 of the rotary diffuser 60, the polarization disturbance that occurs in the diffused illumination light WL can be suppressed as compared with the embodiment described above, in which the transmissive diffuser plate 23 is used.

The illuminator 2A according to the present variation can reduce the polarization disturbance of the diffused illumination light WL, so that the variety of types of color light separated from the illumination light WL can be efficiently incident on the image formation areas of the light modulators 4R, 4G, and 4B. The projector using the illuminator 2A according to the present variation can therefore project a bright, high-quality image by efficiently using the illumination light WL from the illuminator 2A.

The technical scope of the present disclosure is not limited to the embodiment described above, and a variety of changes can be made thereto to the extent that the changes do not depart from the intent of the present disclosure.

The specific descriptions of the shapes, the numbers, the arrangements, the materials, and other factors of the components of the illuminator and the projector shown in the embodiment described above are not limited to those in the embodiment described above and can be changed as appropriate.

The present disclosure will be summarized below as additional remarks.

Additional Remark 1

An illuminator including a first light source that outputs first light having a first wavelength band, a second light source that outputs second light having a second wavelength band different from the first wavelength band, a light combining member that combines the first light and the second light with each other and outputs the combined light, a diffuser plate that diffuses the combined light incident thereon, a light collector that is disposed between the light combining member and the diffuser plate, collects the combined light, and directs the collected combined light toward the diffuser plate, a collimator that parallelizes the combined light output from the diffuser plate, a light homogenizer having a first lens array surface on which the combined light output from the collimator is incident and a second lens array surface via which the light having traveled through the first lens array surface exits, the first and second lens array surfaces integrated with each other, a vibration generator that vibrates the light homogenizer, and a superimposing lens that superimposes the light fluxes output from the light homogenizer on one another.

According to the thus configured illuminator, the vibration generator can vibrate the first and second lens array surfaces integrally with each other to reduce speckle noise in the illumination light with which the illumination receiving areas in the illuminator are illuminated, as if the illumination receiving areas were vibrated.

Additional Remark 2

The illuminator described in the additional remark 1, in which the vibration generator vibrates the first and second lens array surfaces integrally with each other along a direction perpendicular to the optical axis of the light homogenizer.

According to the configuration described above, in which the vibration generator vibrates the first and second lens array surfaces integrally with each other in a direction perpendicular to the optical axis of the light homogenizer, the speckle noise can be efficiently reduced.

Additional Remark 3

The illuminator described in the additional remark 1 or 2, in which the vibration generator vibrates the first and second lens array surfaces integrally with each other along a first direction perpendicular to the optical axis of the light homogenizer and a second direction perpendicular to the optical axis and the first direction.

According to the configuration described above, in which the vibration generator vibrates the first and second lens array surfaces integrally with each other in the two directions, the speckle noise can be efficiently reduced.

Additional Remark 4

The illuminator described in any one of the additional remarks 1 to 3, in which the first lens array surface includes a plurality of first lenslets, the second lens array surface includes a plurality of second lenslets corresponding to the plurality of first lenslets, and the focal point of each of the plurality of second lenslets at the second lens array surface is located at the light incident surface of the corresponding one of the plurality of first lenslets.

According to the configuration described above, even when the light homogenizer is vibrated, the light incident via the light incident surface of each of the first lenslets exits as parallelized light via the corresponding second lenslet. It is therefore possible to suppress a change in the angle of incidence of the light having exited via the second lens array surface with respect to the superimposing lens. Therefore, according to the configuration described above, even when the light homogenizer is vibrated, the illumination area illuminated by the superimposing lens does not move, so that the illumination receiving area can be illuminated with uniform light.

Additional Remark 5

The illuminator described in any one of the additional remarks 1 to 4, in which the first and second lens array surfaces are integrated with each other into a single optical part, and the vibration generator vibrates the optical part.

According to the configuration described above, vibrating the light homogenizer formed of the single optical member, which is the first and second lens array surfaces integrated with each other, allows reduction in the speckle noise in the combined light.

Additional Remark 6

The illuminator described in any one of the additional remarks 1 to 5, further including a holding member that holds a first optical member having the first lens array surface and a second optical member having the second lens array surface integrally with each other and ensures the position of the first lens array surface relative to the second lens array surface, and the vibration generator vibrates the holding member.

According to the configuration described above, vibrating the light homogenizer having the first and second lens array surfaces formed of separate optical members allows reduction in the speckle noise in the combined light.

Additional Remark 7

The illuminator described in any one of the additional remarks 1 to 6, in which the frequency of the vibration generated by the vibration generator is higher than or equal to 60 Hz but lower than or equal to 20000 Hz.

According to the configuration described above, the speckle noise can be efficiently reduced with the cost of the vibration generator suppressed.

Additional Remark 8

The illuminator described in the additional remark 7, in which the vibration generator includes a motor including a shaft that rotates around an axis of rotation, and a rotary member including a weight provided at the shaft of the motor and eccentric with respect to the axis of rotation.

According to the configuration described above, a small, low-cost vibration generator can be achieved by the simple configuration in which the eccentric weight is provided at the rotary shaft of the motor.

Additional Remark 9

The illuminator described in any one of the additional remarks 1 to 8, further including a third light source that outputs third light having a third wavelength band different from the first and second wavelength bands, the light combining member outputting the combined light, which is formed of the first light and the second light with which the third light is combined.

According to the configuration described above, the speckle noise in the combined light containing the three types of color light can be reduced.

Additional Remark 10

A projector including the illuminator described in any one of the additional remarks 1 to 9, a light modulator that modulates light output from the illuminator, and a projection optical apparatus that projects the light modulated by the light modulator.

The thus configured projector, which suppresses generation of speckles, can display a higher-quality image.

Additional Remark 11

The projector described in the additional remark 10, in which the first lens array surface is optically conjugate with an image formation area of the light modulator where the light modulator generates an image.

According to the configuration described above, the first lens array surface, which is conjugate with the projection receiving surface, is vibrated to reduce generation of speckles without degradation of the quality of a projection image, a higher-quality image can be displayed.

What is claimed is:

1. An illuminator comprising:
   a first light source that outputs first light having a first wavelength band;
   a second light source that outputs second light having a second wavelength band different from the first wavelength band;
   a light combining member that combines the first light and the second light with each other and outputs combined light;
   a diffuser plate that diffuses the combined light incident thereon;

a light collector that is disposed between the light combining member and the diffuser plate, collects the combined light, and directs collected combined light toward the diffuser plate;
a collimator that parallelizes the combined light outputted from the diffuser plate;
a light homogenizer having a first lens array surface on which the combined light outputted from the collimator is incident, and a second lens array surface via which the light traveling through the first lens array surface exits, the second lens array surface being integrated with the first lens array surface;
a vibration generator that vibrates the light homogenizer wherein the vibration generator vibrates the first and second lens array surfaces integrally with each other along a direction perpendicular to an optical axis of the light homogenizer; and
a superimposing lens that superimposes light fluxes outputted from the light homogenizer on one another.

2. The illuminator according to claim 1,
wherein the vibration generator vibrates the first and second lens array surfaces integrally with each other along a first direction perpendicular to an optical axis of the light homogenizer and a second direction perpendicular to the optical axis and the first direction.

3. The illuminator according to claim 1,
wherein the first lens array surface includes a plurality of first lenslets,
the second lens array surface includes a plurality of second lenslets corresponding to the plurality of first lenslets, and
a focal point of each of the plurality of second lenslets at the second lens array surface is located at a light incident surface of the corresponding one of the plurality of first lenslets.

4. The illuminator according to claim 1,
wherein the first and second lens array surfaces are integrated with each other into a single optical part, and
the vibration generator vibrates the single optical part.

5. The illuminator according to claim 1, further comprising
a holding member that holds a first optical member having the first lens array surface and a second optical member having the second lens array surface integrally with each other and ensures a position of the first lens array surface relative to the second lens array surface, and
the vibration generator vibrates the holding member.

6. The illuminator according to claim 1,
wherein a frequency of the vibration generated by the vibration generator is higher than or equal to 60 Hz but lower than or equal to 20000 Hz.

7. The illuminator according to claim 6,
wherein the vibration generator includes a motor including a shaft that rotates around an axis of rotation, and a rotary member including a weight provided at the shaft of the motor, the weight being eccentric with respect to the axis of rotation.

8. The illuminator according to claim 1, further comprising
a third light source that outputs third light having a third wavelength band different from the first and second wavelength bands,
wherein the light combining member outputs the combined light formed of the first light and the second light with which the third light is combined.

9. A projector comprising:
the illuminator according to claim 1;
a light modulator that modulates light outputted from the illuminator; and
a projection optical apparatus that projects the light modulated by the light modulator.

10. The projector according to claim 9,
wherein the first lens array surface is optically conjugate with an image formation area of the light modulator where the light modulator generates an image.

11. An illuminator comprising:
a first light source that outputs first light having a first wavelength band;
a second light source that outputs second light having a second wavelength band different from the first wavelength band;
a light combining member that combines the first light and the second light with each other and outputs combined light;
a diffuser plate that diffuses the combined light incident thereon;
a light collector that is disposed between the light combining member and the diffuser plate, collects the combined light, and directs collected combined light toward the diffuser plate;
a collimator that parallelizes the combined light outputted from the diffuser plate;
a light homogenizer having a first lens array surface on which the combined light outputted from the collimator is incident, and a second lens array surface via which the light traveling through the first lens array surface exits, the second lens array surface being integrated with the first lens array surface;
a vibration generator that vibrates the light homogenizer wherein the vibration generator vibrates the first and second lens array surfaces integrally with each other along a first direction perpendicular to an optical axis of the light homogenizer and a second direction perpendicular to the optical axis and the first direction; and
a superimposing lens that superimposes light fluxes outputted from the light homogenizer on one another.

12. The illuminator according to claim 11,
wherein the vibration generator vibrates the first and second lens array surfaces integrally with each other along a direction perpendicular to an optical axis of the light homogenizer.

13. The illuminator according to claim 11,
wherein the first lens array surface includes a plurality of first lenslets,
the second lens array surface includes a plurality of second lenslets corresponding to the plurality of first lenslets, and
a focal point of each of the plurality of second lenslets at the second lens array surface is located at a light incident surface of the corresponding one of the plurality of first lenslets.

14. The illuminator according to claim 11,
wherein the first and second lens array surfaces are integrated with each other into a single optical part, and
the vibration generator vibrates the single optical part.

15. The illuminator according to claim 11, further comprising
a holding member that holds a first optical member having the first lens array surface and a second optical member having the second lens array surface integrally with each other and ensures a position of the first lens array surface relative to the second lens array surface, and
the vibration generator vibrates the holding member.

16. An illuminator comprising:
a first light source that outputs first light having a first wavelength band;
a second light source that outputs second light having a second wavelength band different from the first wavelength band;
a light combining member that combines the first light and the second light with each other and outputs combined light;
a diffuser plate that diffuses the combined light incident thereon;
a light collector that is disposed between the light combining member and the diffuser plate, collects the combined light, and directs collected combined light toward the diffuser plate;
a collimator that parallelizes the combined light outputted from the diffuser plate;
a light homogenizer having a first lens array surface on which the combined light outputted from the collimator is incident, and a second lens array surface via which the light traveling through the first lens array surface exits, the second lens array surface being integrated with the first lens array surface;
a vibration generator that vibrates the light homogenizer wherein the vibration generator vibrates the first and second lens array surfaces integrally with each other along a first direction perpendicular to an optical axis of the light homogenizer and a second direction perpendicular to the optical axis and the first direction; and
a superimposing lens that superimposes light fluxes outputted from the light homogenizer on one another.

17. The illuminator according to claim 16,
wherein the vibration generator vibrates the first and second lens array surfaces integrally with each other along a direction perpendicular to an optical axis of the light homogenizer.

18. The illuminator according to claim 16,
wherein the first lens array surface includes a plurality of first lenslets,
the second lens array surface includes a plurality of second lenslets corresponding to the plurality of first lenslets, and
a focal point of each of the plurality of second lenslets at the second lens array surface is located at a light incident surface of the corresponding one of the plurality of first lenslets.

19. The illuminator according to claim 16,
wherein the first and second lens array surfaces are integrated with each other into a single optical part, and
the vibration generator vibrates the single optical part.

20. The illuminator according to claim 16, further comprising
a holding member that holds a first optical member having the first lens array surface and a second optical member having the second lens array surface integrally with each other and ensures a position of the first lens array surface relative to the second lens array surface, and
the vibration generator vibrates the holding member.

* * * * *